(12) United States Patent
Banfield et al.

(10) Patent No.: US 11,364,975 B2
(45) Date of Patent: Jun. 21, 2022

(54) MOORING CONNECTOR FOR CONNECTING SYNTHETIC FIBRE ROPES

(71) Applicant: NYLACAST LTD, Leicester (GB)

(72) Inventors: Stephen Banfield, Eastbourne (GB); Nigel Briggs, Eastbourne (GB); Damien McCormack, Leicester (GB)

(73) Assignee: NYLACAST LTD, Leicester (GB)

( * ) Notice: Subject to any disclaimer, the term of this patent is extended or adjusted under 35 U.S.C. 154(b) by 35 days.

(21) Appl. No.: 16/964,426

(22) PCT Filed: Jan. 24, 2019

(86) PCT No.: PCT/GB2019/050205
§ 371 (c)(1),
(2) Date: Jul. 23, 2020

(87) PCT Pub. No.: WO2019/145723
PCT Pub. Date: Aug. 1, 2019

(65) Prior Publication Data
US 2021/0047004 A1    Feb. 18, 2021

(30) Foreign Application Priority Data
Jan. 24, 2018   (GB) ................................... 1801168

(51) Int. Cl.
*B63B 21/20*   (2006.01)
*B63B 21/04*   (2006.01)
(Continued)

(52) U.S. Cl.
CPC ............. *B63B 21/20* (2013.01); *B63B 21/04* (2013.01); *F16G 11/14* (2013.01); *B63B 2021/003* (2013.01); *B63B 2021/203* (2013.01)

(58) Field of Classification Search
CPC ... B63B 21/20; B63B 21/04; B63B 2021/003; B63B 2021/203; F16G 11/14
(Continued)

(56) References Cited

U.S. PATENT DOCUMENTS

| 2013/0145740 | A1* | 6/2013 | Schulz | .................. D07B 1/185 57/231 |
|---|---|---|---|---|
| 2017/0066507 | A1 | 3/2017 | Arlet | |
| 2017/0297658 | A1 | 10/2017 | Mullikin | |

FOREIGN PATENT DOCUMENTS

| EP | 2489584 | 8/2012 |
| WO | WO 2017/144510 | 8/2017 |

OTHER PUBLICATIONS

Search Report & Written Opinion issued in Int'l Appl. No. PCT/GB2019/050205 (2019).

* cited by examiner

*Primary Examiner* — Anthony D Wiest
(74) *Attorney, Agent, or Firm* — Barnes & Thornburg LLP

(57) ABSTRACT

The mooring connector has a hollow body or shell and a central core. The hollow body or shell is formed from an engineering polymer, e.g. polyamide, and is generally cylindrical and has two shell parts. The hollow body has an outer surface and an inner surface. The outer surface has a central groove portion or rope running surface and two outer groove portions or rope running surfaces. The two outer groove portions or rope running surfaces are tapered, such that the outer groove portions are not equally spaced from the central groove portion around the entire circumference of the hollow body or shell. The central core is a solid body that is formed from a metallic material, for example steel. The central core is generally cylindrical and has a shape that is configured to correspond to the shape of the recess of the (Continued)

hollow body or shell. The central core has a central portion and arms that extend from the central portion to outer flanges. The diameter of the central core at the outer flanges and the central portion is greater than the diameter of the central core at the arms. This is to ensure that the central core has the required strength in the areas of the mooring connector that supports a rope, in use.

16 Claims, 3 Drawing Sheets

(51) Int. Cl.
    *B63B 21/00*     (2006.01)
    *F16G 11/14*     (2006.01)

(58) Field of Classification Search
    USPC .......................................................... 114/293
    See application file for complete search history.

MOORING CONNECTOR FOR CONNECTING SYNTHETIC FIBRE ROPES

CROSS REFERENCE TO RELATED APPLICATIONS

This application is a U.S. nationalization under 35 U.S.C. § 371 of International Application No. PCT/GB2019/050205, filed 24 Jan. 2019, which claims priority to United Kingdom Patent Application No. 1801168.4, filed 24 Jan. 2018. The disclosures set forth in the referenced applications are incorporated herein by reference in their entireties.

The present invention relates to a mooring connector, for example a marine mooring connector.

Mooring connectors are devices that are employed to connect components of offshore installations, for example, anchor chains or floating renewable energy devices, via mooring ropes.

Such mooring connectors are critical for the operation of offshore installations and so must be able to withstand the extreme, high energy, offshore environment.

Mooring ropes are held under tension against the surface of the connector and the connector and rope running through it move relative to each other due to the movement resulting from swell, the tides, wind and other phenomena.

Mooring ropes for large vessels such as tankers, gas carriers and container ships have typically been made from steel wire. However, these ropes are heavy which makes them difficult and time consuming to handle, placing an additional burden on crew and increasing time at berth. Also, as the wire ropes become worn, individual wires break away and they can cut the hands of rope handling personnel. Also, in the salt water environment steel ropes can be subject to corrosion.

Accordingly, synthetic fibre ropes have been offered as an alternative to steel. Generally these synthetic fibre ropes are made from a high modulus polyethylene fibre, aramid fibre or liquid crystal polyester fibre, all of which combine high strength with good resistance to stretch and make their performance largely equivalent to steel wire rope. The ropes are lighter and easier to handle. They tend not to present sharp fibres as they wear.

Also, steel ropes are prone to sparking as they drag along the deck and that risk, which is significant when it occurs on a tanker or gas carrier, is eliminated with the synthetic fibre rope.

One issue with the synthetic fibre ropes in relation to steel ropes is that they have a relatively poor wear resistance. Mooring connectors are generally made of steel. Whilst the steel surface does not present a wear problem for steel wire rope, the surface is rough enough to accelerate wear in synthetic fibre ropes. Steel mooring connectors are also heavy and prone to rust, which increases the abrasive qualities of the connector when the synthetic fibre rope is passing over it.

Some mooring connectors include exposed spools that are made from non-metallic materials, for example polymers. The steel components of these mooring connectors still causes wear to synthetic fibre ropes. One solution has been to coat the outer surface of synthetic fibre ropes with a polyurethane sheath; however, chaffing and wear of the polyurethane sheath and underlying synthetic fibre rope is still a challenge.

According to a first aspect of the present invention there is provided a mooring connector including a central core and a shell, wherein the shell includes a rope running surface.

The combination of a central core and a shell enables the provision of a high strength, yet lightweight, mooring connector.

The central core may include a first material and the shell may include a second material, wherein the first material is different to the second material. In this way, the material properties of the central core and the shell can be tailored to optimise the strength and weight of the mooring connector as well as the friction properties of the rope running surface. The central core may include a metallic material, for example steel, to ensure that the mooring connector has the required strength characteristics.

The shell may include a non-metallic material, for example an engineering polymer such as polyamide, to ensure that the weight of the mooring connector is controlled, that the rope running surface has desirable friction properties and the mooring connector has good corrosion resistance.

The shell may substantially surround the central core. In this way, the corrosion resistance of the mooring connector is further improved.

The shell may have an inner surface that is arranged to receive the central core. The mooring connector may, therefore, have an improved service life.

The shell may have an outer surface on which the rope running surface is formed. The shell may include a plurality of rope running surfaces.

At least one rope running surface of the plurality of rope running surfaces may be tapered. The reliability of the mooring connector may therefore be improved.

The shell may include a central groove in which a first rope running surface of the plurality of rope running surfaces is located.

The shell may include an outer groove in which a second rope running surface of the plurality of rope running surfaces is located.

The shell may include a first shell part and a second shell part. The first shell part and the second shell part may be fastened together to secure the central core within the shell.

The mooring connector may further include an outer casing that is configured to substantially surround the shell. In this way, the reliability and service life of the mooring connector may be increased.

The outer casing may include a recess that is configured to allow a rope to pass therethrough.

The outer casing may include a plurality of recesses that are configured to allow one or more ropes to pass therethrough.

The outer casing may include a first casing part and a second casing part. The first casing part may include at least one recess of the plurality of recesses that are configured to allow a rope to pass therethrough and the second casing part may include a further at least one recess of the plurality of recesses that are configured to allow a rope to pass therethrough.

Embodiments of the present invention will now be described with reference to the accompanying figures in which.

Figure 1:
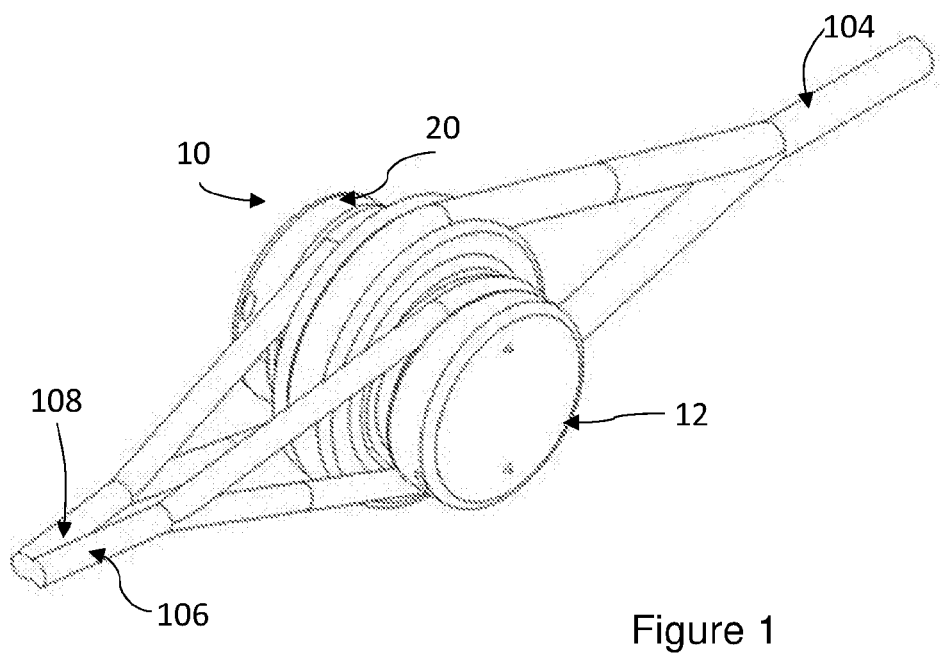
FIG. 1 is a perspective view of a mooring connector according to a first embodiment of the present invention.

Referring to the Figures, there is a mooring connector 10. The mooring connector 10 has a hollow body or shell 12 and a central core 14.

The hollow body or shell 12 is formed from an engineering polymer, e.g. polyamide, is generally cylindrical and has two shell parts 16, 18. The hollow body 12 has an outer surface 20 and an inner surface 22.

The outer surface 20 has a central groove portion or rope running surface 24 and two outer groove portions or rope running surfaces 26, 28. The two outer groove portions or rope running surfaces 26, 28 are tapered, as shown in FIG. 3a, such that the outer groove portions 26, 28 are not equally spaced from the central groove portion 24 around the entire circumference of the hollow body or shell 12.

Figure 3A:
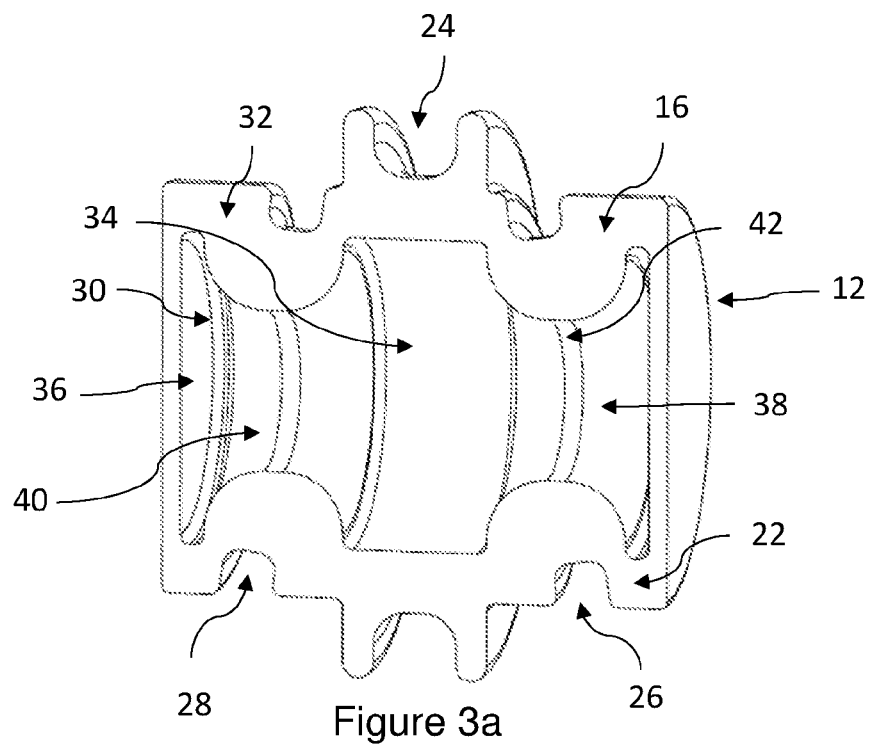
FIG. 3a is a perspective view of the inner surface of the shell of the mooring connector of FIG. 1.
Figure 3B:
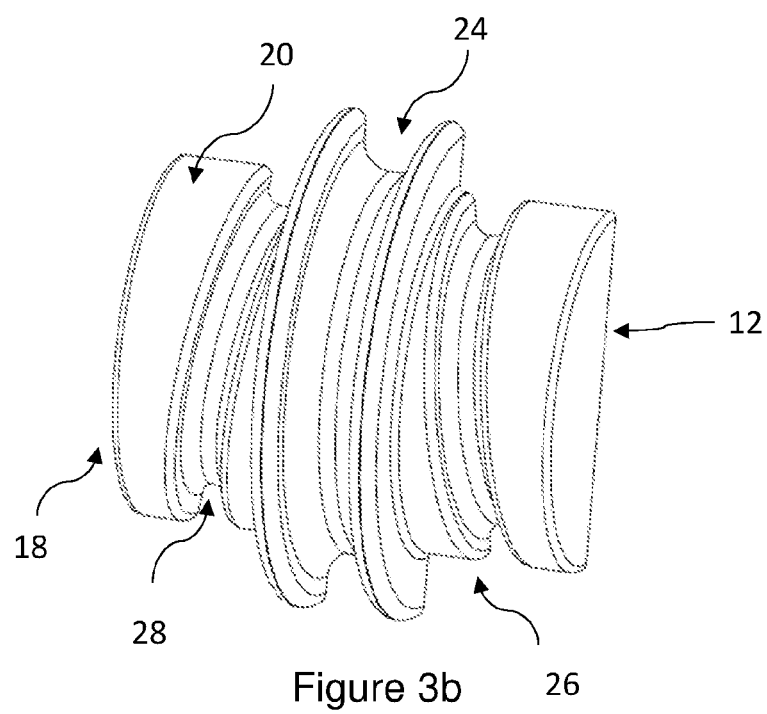
FIG. 3b is a perspective view of the outer surface of the shell of the mooring connector of FIG. 1.

With particular reference to FIG. 3a, the inner surface 22 has a recess that is defined by an outer wall 32. The recess 30 is shaped such that the thickness of the outer wall 32 is increased in the portions of the hollow body 12 that are inward of the central and outer groove portions 24, 26, 28, as shown in FIG. 3a. This is to ensure that the shell 12 has the required strength in the areas of the mooring connector 10 that supports a rope, in use.

With particular reference to FIG. 3a, the recess 30 has a central recess region 34, an outer recess region 36 at a first end of the recess 30, an outer recess region 38 at a second end of the recess 30, a first intermediate recess region 40 between the outer recess region 36 and the central recess region 34 and a second intermediate recess region 42 between the outer recess region 38 and the central recess region 34. The diameter of the recess 30 at the outer recess regions 36, 38 and the central recess region 34 is greater than the diameter of the recess 30 at the intermediate recess regions 40, 42.

Figure 2:
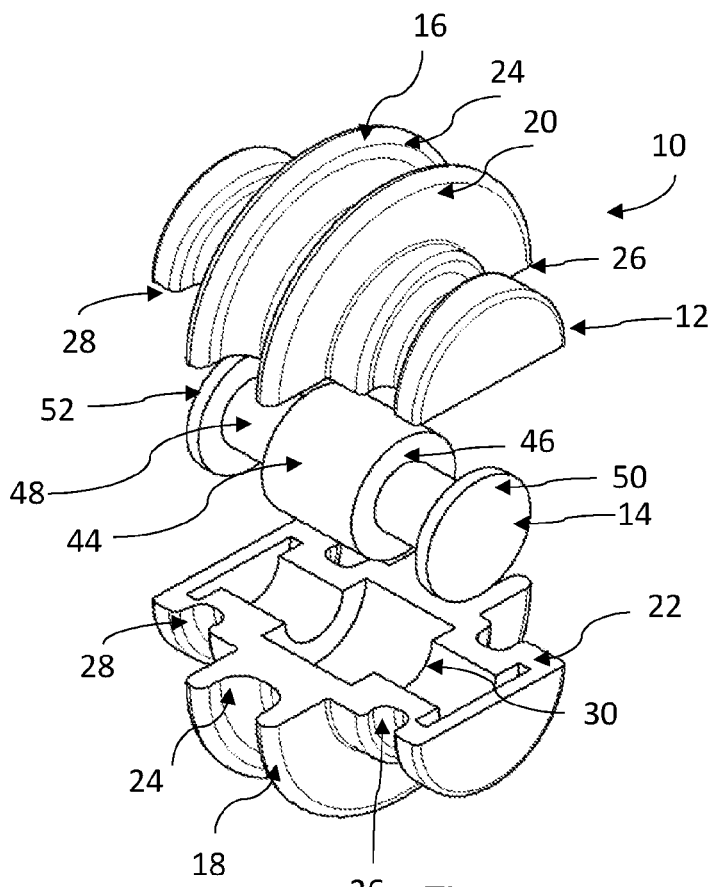
FIG. 2 is an exploded view of the central core and shell of the mooring connector of FIG. 1.

Referring now to FIG. 2, the central core 14 is a solid body that is formed from a metallic material, for example steel. The central core 14 is generally cylindrical and has a shape that is configured to correspond to the shape of the recess 30 of the hollow body or shell 12. The central core 14 has a central portion 44 and arms 46, 48 that extend from the central portion 44 to outer flanges 50, 52. The diameter of the central core 14 at the outer flanges 50, 52 and the central portion 44 is greater than the diameter of the central core 14 at the arms 46, 48. This is to ensure that the central core 14 has the required strength in the areas of the mooring connector 10 that supports a rope, in use.

Figure 4:
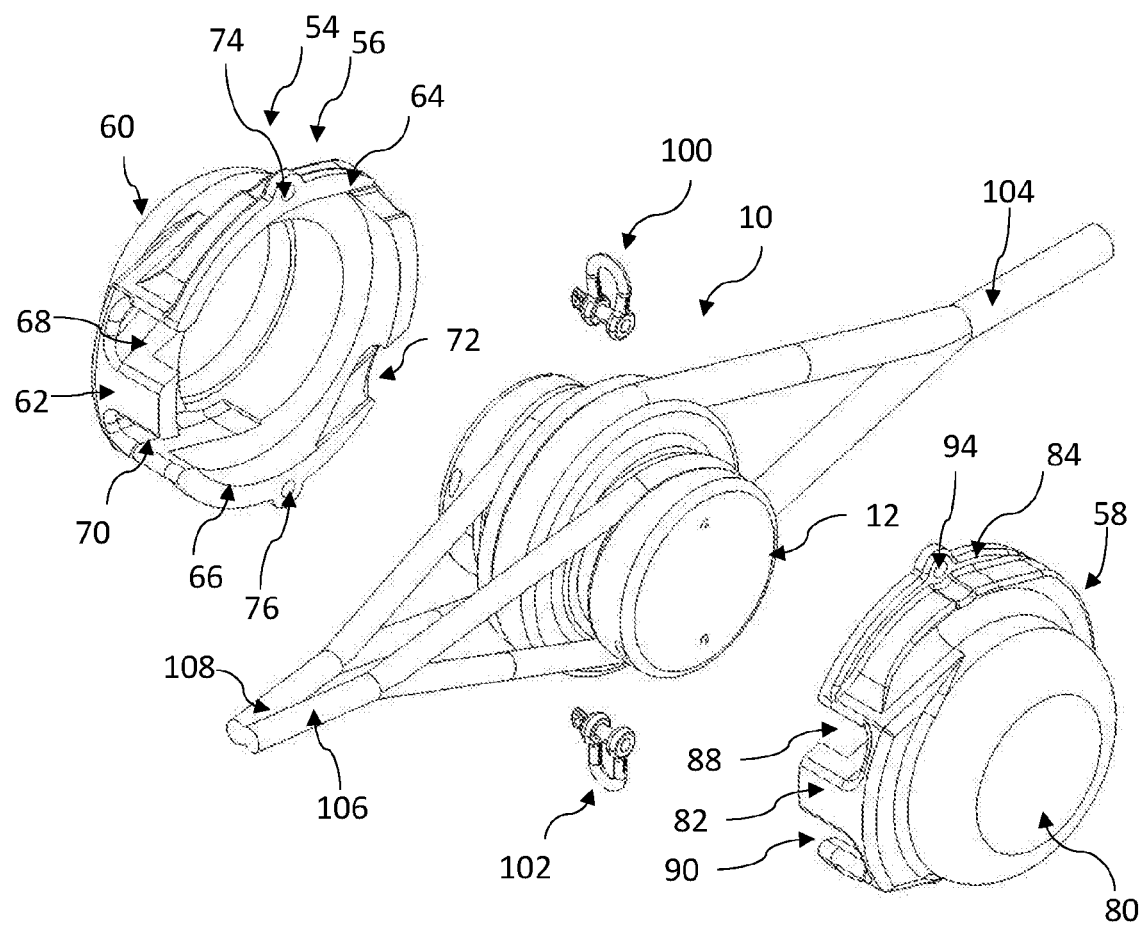
FIG. 4 is an exploded view of the mooring connector of FIG. 1 with an outer casing.

As shown in FIG. 4, the mooring connector 10 also has an outer casing or cover 54. The outer casing or cover 54 is formed from a metallic material or a non-metallic material and has a first casing part or end cap 56 and a second casing part or end cap 58.

The first casing part or end cap 56 has a circular outer face 60, an outer wall 62, an upper flange 64 and a lower flange 66.

The outer wall 62 includes a pair of openings or recesses or cut outs 68, 70 on one side and an opening or recess or cut out 72 on the opposite side. The upper flange 64 includes an aperture or hole 74. Similarly, the lower flange 66 includes an aperture or a hole 76.

In the same way, the second casing part or end cap 58 has a circular outer face 80, an outer wall 82, an upper flange 84 and a lower flange (not shown).

The outer wall 82 includes a pair of openings or recesses or cut outs 88, 90 on one side and a further opening or recess or cut out (not shown) on the opposite side. The upper flange 84 includes an aperture or hole 94. Similarly, the lower flange (not shown) includes an aperture or hole (not shown).

The outer casing 54 also includes connectors 100, 102.

The mooring connector is assembled as follows.

The metallic central core 14 is cast from a metallic material. The two shell parts 16, 18 are formed from an engineering polymer, e.g. polyamide.

The central core 14 is fitted into the recess 30 of the shell part 18 such that the outer flange 50 fits within the outer recess region 38, the arm 46 fits within the intermediate recess portion 42, the central portion 44 fits within the central recess region 34, the arm 48 fits within the intermediate recess region 40 and the outer flange 52 fits within the outer recess region 36 of the shell part 18.

The shell part 16 is placed on top of the shell part 18 such that the outer wall 32 of the inner surface 22 of the shell part 16 abuts the outer wall 32 of the inner surface 22 of the shell part 18.

As described above in relation to the shell part 18, the central core 14 fits into the recess 30 of the shell part 16 such that the outer flange 50 of the central core 14 fits into the outer recess region 38 of the shell part 16, the arm 46 fits into the intermediate recess region 42, the central portion 44 fits into the central recess region 34, the arm 48 fits into the intermediate recess region 40 and the outer flange 52 fits into the outer recess region 36 of the shell part 16.

The shell parts 16, 18 may then be bolted or fastened together by any known fastening means.

Once the mooring connector shell and core have been assembled, ropes 104, 106, 108 can be mounted on the outer surface 20 as shown in FIGS. 1 and 4. The rope 104 is positioned within the central groove 24 of the shell 12, the rope 106 is positioned within the outer groove 26 of the shell 12 and the rope 108 is positioned within the outer groove 28 of the shell 12.

The outer casing parts or end caps 56, 58 are then positioned around either end of the mooring connector such that the ropes 106, 108 extend through the openings 68, 70 of the first casing part 56 and through the openings 88, 90 of the second casing part 58 and the rope 104 extends through the opening 70 of the first casing part 56 and the opening (not shown) of the second casing part 58.

To secure the two casing parts 56, 58, the connector 100 is threaded through the apertures 74, 94 of the flanges 64, 84 of the first casing part 56 and the second casing part 58. In the same way, the connector 102 is threaded through the aperture 76 of the flange 66 of the first casing part 56 and the corresponding aperture (not shown) of the flange (not shown) of the second casing part 58.

The ropes are arranged around the connector such that the unit is held in compression whilst in operation.

The outer casing of the connector is formed in two-parts to encase and enclose the rope "eyes", thereby keeping the assembly together with the ropes opposed to each other.

The invention claimed is:

1. A marine mooring connector for connecting a first mooring rope with a second mooring rope, the mooring connector including a central core and a shell, wherein the shell includes a first rope running surface for the first rope and a second rope running surface for the second rope;

the mooring connector further including and outer casing that is configured to substantially surround the shell, wherein the outer casing includes a recess that is configured to allow a rope to pass therethrough.

2. A mooring connector according to claim 1, wherein the central core includes a first material and the shell includes a second material, wherein the first material is different to the second material.

3. A mooring connector according to claim 1, wherein the central core includes a metallic material and the shell includes a non-metallic material.

4. A mooring connector according to claim 1, wherein the shell substantially surrounds the central core.

5. A mooring connector according to claim 1, wherein the shell has an inner surface that is arranged to receive the central core.

6. A mooring connector according to claim 5, wherein the inner surface includes a recess to receive the central core.

7. A mooring connector according to claim 1, wherein the shell has an outer surface on which the rope running surfaces are formed.

8. A mooring connector according to claim 1, wherein at least one of the first and second rope running surfaces is tapered.

9. A mooring connector according to claim 1, wherein the shell includes a central groove in which the first rope running surface is located.

10. A mooring connector according to claim 1, wherein the shell includes an outer groove in which the second rope running surface is located.

11. A mooring connector according to claim 1, wherein the shell includes a first shell part and a second shell part.

12. A mooring connector according to claim 1, wherein the outer casing includes a plurality of recesses that are configured to allow a rope to pass therethrough.

13. A mooring connector according to claim 1, wherein the outer casing includes a first casing part and a second casing part.

14. A mooring connector according to claim 1, wherein both of the first and second rope running surfaces are tapered.

15. A marine mooring connector for connecting a first mooring rope and a second mooring rope including a central core, a shell that includes a first rope running surface for engaging the first mooring rope and a second rope running surface for engaging the second mooring rope, and an outer casing that is configured to substantially surround the shell;
wherein the outer casing includes a plurality of recesses that are configured to allow a rope to pass therethrough; and
wherein the outer casing further includes a first casing part and a second casing part in which the first casing part includes at least one recess of the plurality of recesses that are configured to allow the first mooring rope to pass therethrough and the second casing part includes a further at least one recess of the plurality of recesses that are configured to allow a second mooring rope to pass therethrough.

16. A mooring connector according to claim 15, wherein both of the first and second rope running surfaces are tapered.

* * * * *